(12) United States Patent
Totani

(10) Patent No.: US 12,275,195 B2
(45) Date of Patent: Apr. 15, 2025

(54) HEAT SEAL DEVICE

(71) Applicant: Totani Corporation, Kyoto (JP)

(72) Inventor: Mikio Totani, Kyoto (JP)

(73) Assignee: Totani Corporation, Kyoto (JP)

( * ) Notice: Subject to any disclaimer, the term of this patent is extended or adjusted under 35 U.S.C. 154(b) by 164 days.

(21) Appl. No.: 17/920,930

(22) PCT Filed: Feb. 19, 2021

(86) PCT No.: PCT/JP2021/006318
§ 371 (c)(1),
(2) Date: Oct. 24, 2022

(87) PCT Pub. No.: WO2021/220592
PCT Pub. Date: Nov. 4, 2021

(65) Prior Publication Data
US 2023/0158755 A1    May 25, 2023

(30) Foreign Application Priority Data
May 1, 2020 (JP) .................................. 2020-081395

(51) Int. Cl.
*B29C 65/00* (2006.01)
*B29C 65/18* (2006.01)
*B65B 51/14* (2006.01)
*B65B 57/00* (2006.01)

(52) U.S. Cl.
CPC .......... *B29C 66/8161* (2013.01); *B29C 65/18* (2013.01); *B29C 66/1122* (2013.01); *B65B 51/14* (2013.01); *B65B 57/00* (2013.01)

(58) Field of Classification Search
None
See application file for complete search history.

(56) References Cited

U.S. PATENT DOCUMENTS

| 5,540,802 A * | 7/1996 | Totani ..................... B29C 66/96 |
| | | 53/64 |
| 11,198,254 B2 * | 12/2021 | Ohnishi ................ B29C 66/431 |
| 2010/0018155 A1 * | 1/2010 | Forst ................... B29C 66/8221 |
| | | 53/64 |

(Continued)

FOREIGN PATENT DOCUMENTS

| EP | 3798147 A1 | 3/2021 |
| JP | 2007307880 A | 11/2007 |

(Continued)

*Primary Examiner* — Jacob T Minskey
*Assistant Examiner* — Caroline Beha
(74) *Attorney, Agent, or Firm* — NovoTechIP International PLLC

(57) ABSTRACT

A heat seal device for use in a bag making apparatus includes: a first heat seal member; a second heat seal member facing the first heat seal member; a heater for heating at least one of the first heat seal member or the second heat seal member; a drive mechanism configured to move the first heat seal member towards and away from the second heat seal member so as to releasably sandwich a web between the first and second heat seal members; a sensor disposed to detect acceleration of the first heat seal member; and a measurement part configured to measure a sandwiching time during which the web is sandwiched by the first and second heat seal members based on data from the sensor.

4 Claims, 5 Drawing Sheets

(56) References Cited

U.S. PATENT DOCUMENTS

| | | | |
|---|---|---|---|
| 2013/0267399 A1* | 10/2013 | Schiebout | B29C 66/8167 493/193 |
| 2018/0126661 A1* | 5/2018 | Dunlap | B29C 66/8167 |
| 2022/0016853 A1* | 1/2022 | Lakhani | B29C 66/861 |

FOREIGN PATENT DOCUMENTS

| | | |
|---|---|---|
| JP | 2008505024 A | 2/2008 |
| JP | 2009234643 A | 10/2009 |
| JP | 2012001211 A | 1/2012 |
| JP | 2018076090 A | 5/2018 |
| WO | 2006003634 A1 | 1/2006 |
| WO | 2019225266 A1 | 5/2020 |

* cited by examiner

HEAT SEAL DEVICE

TECHNICAL FIELD

This application relates to a heat seal device for use in a bag making apparatus.

BACKGROUND

For example, a bag making apparatus includes a feed device that superposes two or more continuous sheet panels (webs) on each other and intermittently feeds them in their longitudinal direction. The bag making apparatus further includes at least one heat seal device that heat-seals the sheet panels during every intermittent feed cycle of the sheet panels. The bag making apparatus further includes a cross cut device that is disposed downstream of the heat seal device and cross-cuts the sheet panels in their width direction during every intermittent feed cycle of the sheet panels. Every time the sheet panels are cross-cut, a bag such as a plastic bag is made.

As disclosed in Patent documents 1 and 2, the heat seal device generally includes a first heat seal member and a second heat seal member facing each other. At least one of the first or second heat seal member is heated by a heater. The heat seal device further includes a drive mechanism that moves the first heat seal member towards and away from the second heat seal member.

The drive mechanism moves the first heat seal member towards the second heat seal member to sandwich the sheet panels between both heat seal members. This causes the sheet panels to be heat-sealed. Then, the drive mechanism moves the first heat seal member away from the second heat seal member to release sandwiching the sheet panels.

There are various factors that influence quality of heat-sealing, such as seal pressure. One of the factors is a seal time, that is, a sandwiching time during which the sheet panels are sandwiched by the heat seal members. The sandwiching time should be properly adjusted and controlled. Typically, a user of the heat seal device checks the sandwiching time by visually observing the heat seal operation, and then adjusts the sandwiching time by operating the component(s) of the drive mechanism. However, the visual check may be inaccurate and can lead to improper adjustment. This can result in variability in the quality of heat-sealing.

An object of the present application is to provide a heat seal device including a configuration for accurately detecting a sandwiching time during which a web is sandwiched by heat seal members.

SUMMARY

According to an aspect of the present application, there is provided a heat seal device for use in a bag making apparatus, the heat seal device including: a first heat seal member; a second heat seal member facing the first heat seal member; a heater for heating at least one of the first heat seal member or the second heat seal member; a drive mechanism configured to move the first heat seal member towards and away from the second heat seal member so as to releasably sandwich a web between the first and second heat seal members; a sensor disposed to detect acceleration of the first heat seal member; and a measurement part configured to measure a sandwiching time during which the web is sandwiched by the first and second heat seal members based on data from the sensor.

The measurement part may be configured to calculate a time from a first peak of the acceleration to a second peak of the acceleration as the sandwiching time. Here, the first peak is generated due to start of sandwiching the web by the first and second heat seal members, and the second peak is generated due to release of sandwiching the web by the first and second heat seal members.

The heat seal device may further include: a determination part configured to determine whether the sandwiching time complies with a predetermined requirement; and a warning device configured to output a warning if the determination part determines that the sandwiching time complies with the predetermined requirement.

The predetermined requirement may include a requirement that the sandwiching time is out of a predetermined range.

The predetermined requirement may include a requirement that the sandwiching time is greater than or less than a predetermined threshold value.

The drive mechanism may include a support for supporting the first heat seal member. The sensor may be attached to the support.

The drive mechanism may include a charge spring disposed to bias the first heat seal member towards the second heat seal member while the web is sandwiched by the first and second heat seal members.

DETAILED DESCRIPTION

A heat seal device according to implementations of the present application will now be described with reference to the accompanying drawings. The heat seal device is incorporated into a bag making apparatus, for example, an example of a bag making apparatus in FIG. 5A and FIG. 5B.

Figure 1:
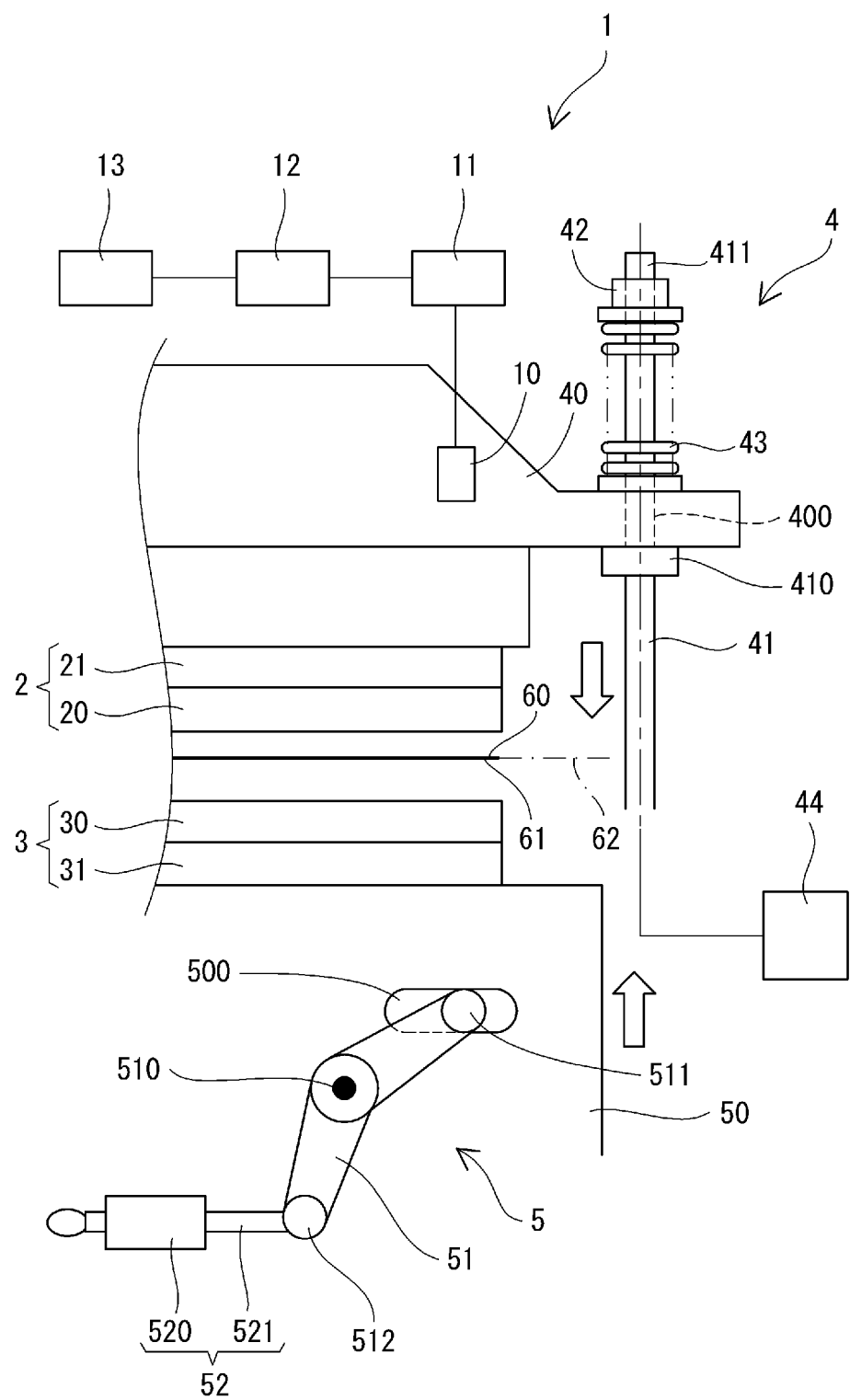
FIG. 1 schematically and partially illustrates an example of a heat seal device.

FIG. 1 schematically illustrates a main section of an example of a heat seal device 1. As illustrated in FIG. 1, the heat seal device 1 includes a first seal unit 2, a second seal unit 3, a drive mechanism 4 and a retraction mechanism 5.

At least two webs 60 and 61 are superposed on each other and intermittently fed in their longitudinal direction by a feed device (e.g., a feed device 7 in FIG. 5B) of the bag making apparatus. The first and second seal units 2 and 3 face each other with the webs 60 and 61 interposed therebetween. The webs 60 and 61 are horizontally fed, and the facing direction of the seal units 2 and 3 is the vertical direction. The first seal unit 2 is located above the web 60 and 61, and the second seal unit 3 is located below the webs 60 and 61.

The first seal unit 2 includes a first heat seal member 20 and a first heater 21 for heating the first heat seal member 20. The second seal unit 3 includes a second heat seal member 30 and a second heater 31 for heating the second heat seal member 30.

The first and second heat seal members 20 and 30 are used to sandwich at least two or more webs 60 and 61 for heat-sealing them as described below. The first and second heat seal members 20 and 30 are attached to the first and second heaters 21 and 31, respectively, to face each other in the vertical direction with the webs 60 and 61 interposed therebetween. Each of the first and second heaters 21 and 31 has a heater cartridge inside thereof. Supplying electric power to the heater cartridge makes the heater cartridge generate heat. The heat is transmitted to the heat seal member 20 or 30.

The drive mechanism 4 is configured to move the first heat seal member 20 towards and away from the second heat seal member 30 so as to releasably sandwich the webs 60 and 61 between the first and second heat seal members 20 and 30. The drive mechanism 4 in the implementation is configured to move the whole of the first seal unit 2 towards and away from the second seal unit 3.

The drive mechanism 4 may include, for example, a support 40, a pole 41, an adjustment nut 42, a charge spring 43 and a pole operation mechanism 44.

The support 40 is configured as an upper beam and supports the first seal unit 2 and thus the first heat seal member 20.

The pole 41 extends in the facing direction of the seal units 2 and 3 (the first and second heat seal members 20 and 30), that is, in the vertical direction. The pole 41 is inserted through a through hole 400 of the support 40. The pole 41 has a flange stopper 410 around its circumference. The stopper 410 is located on one side (lower side) with respect to the through hole 400. The stopper 410 is configured to be vertically adjustable in position with respect to the pole 41. For example, a well-known double nut may be used as the stopper 410. That is, two nuts are mounted on and around the threaded outer circumference of the pole 41. A bolt portion 411 having a threaded outer circumference is provided on the other side (upper side) with respect to the through hole 400 of the pole 41.

The adjustment nut 42 is mounted on and around the bolt portion 411 of the pole 41 and screwed with it. Therefore, operating (rotating) the adjustment nut 42 allows the adjustment nut 42 to move along the bolt portion 411 with respect to the bolt portion 411.

The charge spring 43 is disposed to bias the first heat seal member 20 towards the second heat seal member 30 as described below while the webs 60 and 61 are sandwiched by the first and second heat seal members 20 and 30. The charge spring 43 is arranged between the support 40 and the adjustment nut 42 and extends between these 40 and 42 to bias the support 40 towards the stopper 410. The pole 41 (the bottle portion 411) is inserted through the charge spring 43. Operating the adjustment nut 42 allows for adjusting the biasing force of the charge spring 43.

The pole operation mechanism 44 is operably connected to the pole 41 at the lower end of the pole 41 and configured to move the pole 41 in the facing direction of the seal units 2 and 3, that is, in the vertical direction. The pole operation mechanism 44 in the implementation is configured to move the pole 41 in conjunction with the intermittent feed of the webs 60 and 61 by the feed device (e.g., the feed device 7 in FIG. 5B) of the bag making apparatus. The pole operation mechanism 44 may employ the well-known configuration as disclosed in Patent documents 1 and 2, etc.

Although FIG. 1 only illustrates the section of the heat seal device 1 including one end of the support 40, the poles 41 and the components related thereto are located on the opposite ends of the support 40.

The retraction mechanism 5 is configured to move the second seal unit 3 between the position (FIG. 1) where its second heat seal member 30 is retracted to some extent from the feed height 62 of the webs 60 and 61, and the position (FIG. 2) where the second heat seal member 30 reaches the feed height 62. The second heat seal member 30 being retracted below from the feed height 62 as illustrated in FIG. 1 prevents the webs 60 and 61 from being scorched during the stand-by state of the heat seal device 1 due to the heat which is transmitted from the heat seal member 30.

The retraction mechanism 5 may include, for example, a support 50, an arm 51 and a cylinder 52.

The support 50 is configured as a lower beam and supports the second (lower) seal unit 3 and thus the second heat seal member 30. A slot 500 is formed in the support 50 to extend horizontally.

The arm 51 is supported by a frame (not shown) to be rotatable around a rotation shaft 510 which is located at the center section of the arm 51. The arm 51 include a slider 511 at the first end thereof. The slider 511 is located in the slot 500 to be slidable along the slot 500.

The cylinder 52 includes a tube 520 and a rod 521. The tube 520 is attached to the frame (not shown). The tip of the rod 521 is attached to the second end 512 of the arm 51.

With the above configuration, the retraction mechanism 5 can move the second seal unit 3 in the vertical direction by actuating the cylinder 52. The retraction mechanism 5 can expand the rod 521 to rotate the arm 51 around the rotation shaft 510, thereby moving the support 50 and the second seal unit 3 upward, that is, positioning the second heat seal member 30 at the feed height 62 (see FIG. 2). Conversely, the retraction mechanism 5 can contract the rod 521, thereby moving the support 50 and the second seal unit 3 downward, that is, retracting the second heat seal member 30 from the feed height 62.

The drive mechanism 4 and the retraction mechanism 5 are mere examples. Several configurations may be adopted.

The heat seal operation will now be described. FIG. 1 illustrates the heat seal device 1 in the stand-by state. The first and second seal units 2 and 3 are kept retracted from the webs 60 and 61 (thus, the feed height 62) by the drive mechanism 4 and the retraction mechanism 5, respectively. The heat seal device 1 heat-seals the webs 60 and 61 as described below during the pause phase of the intermittent feed cycle of the webs 60 and 61.

Figure 2:
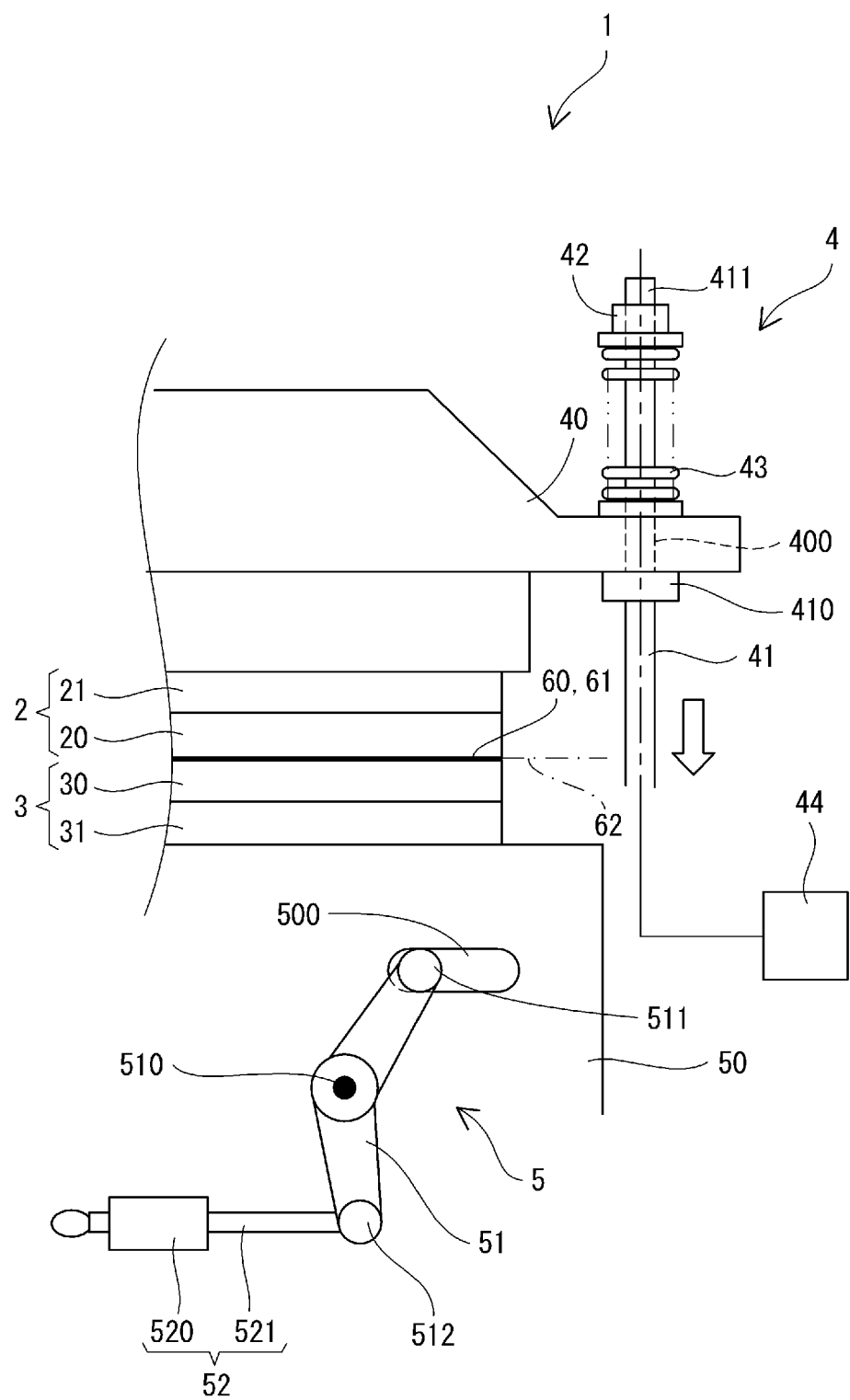
FIG. 2 illustrates operation by the heat seal device.

As illustrated in FIG. 1 and FIG. 2, the retraction mechanism 5 moves the second seal unit 3 upward towards the webs 60 and 61 to position the second heat seal member 30 at the feed height 62. Then, the drive mechanism 4 moves the pole 41 downward to move the support 40 and the first seal unit 2 downward towards the webs 60 and 61, thereby also positioning the first heat seal member 20 at the feed height 62. As a result, the webs 60 and 61 are sandwiched and heated by the first and second heat seal members 20 and 30 (which are heated by the first and second heaters 21 and 31, respectively).

The drive mechanism 4 keeps moving the pole 41 downward. Since the first heat seal member 20 has already sandwiched the webs 60 and 61 in cooperation with the second heat seal member 30, the first seal unit 2 and the support 40 fail to move any further downward. Thus, only the pole 41 moves downward while compressing the charge spring 43 as illustrated in FIG. 2 and FIG. 3.

Then, the compressed charge spring 43 biases the first heat seal member 20 towards the second heat seal member 30 via the support 40. That is, the biasing force of the charge spring 43 is applied to the webs 60 and 61. This causes the webs 60 and 61 to be pressurized. The webs 60 and 61 are heat-sealed by being heated and pressurized.

Thereafter, the drive mechanism 4 moves the pole 41 upward to move the first heat seal member 20 away from the webs 60 and 61. The sandwiching of the webs 60 and 61 by the heat seal members 20 and 30 is released. In other words, heat-sealing is finished. During the continuation of the series of the driving operations, the retraction mechanism 5 maintains the position illustrated in FIG. 2, while the first heat seal member 20 repeatedly moves upward and downward in conjunction with the intermittent feed of the webs 60 and 61. When the apparatus is not supposed to be operated for a while after completion of the series of the driving operations, the retraction mechanism 5 moves the second heat seal member 30 away from the webs 60 and 61, and the heat seal device 1 returns to the stand-by state illustrated in FIG. 1. When the apparatus is operated again, the webs 60 and 61 restart to be fed, so that the above operations are repeated.

Figure 3:
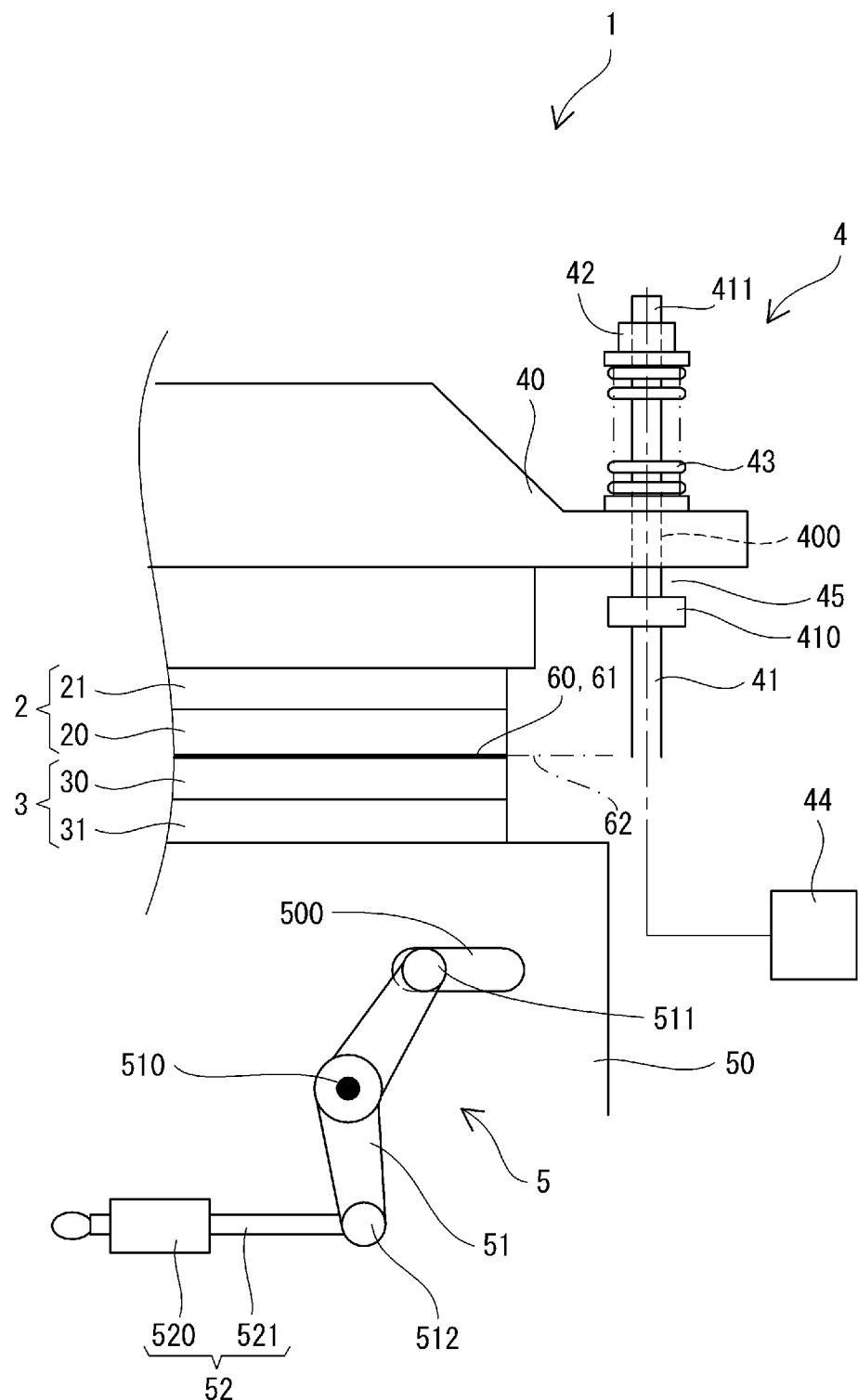
FIG. 3 illustrates operation by the heat seal device.

It is possible to check the time during which the webs 60 and 61 are sandwiched by the first and second heat seal members 20 and 30 (hereinafter, referred to as the sandwiching time), i.e., the heat seal time by visually observing a gap 45 generated between the stopper 410 and the support 40 only when the webs 60 and 61 are being pressurized, as illustrated in FIG. 3. As described below, if the gap 45 which is formed in the state that the pole 41 has moved downward to the lower stroke end is larger, the heat seal time is longer; if this gap 45 is smaller, the heat seal time is shorter. In addition to this, the heat seal device 1 in the implementation provides a configuration for accurately detecting the sandwiching time without visual observation, as described below.

As illustrated in only FIG. 1, the heat seal device 1 further includes a sensor 10, a measurement part 11, a determination part 12 and a warning device 13.

The sensor 10 is disposed to detect acceleration of the first heat seal member 20. The sensor 10 is an accelerometer which outputs signals indicating the acceleration to the measurement part 11. The sensor 10 in the implementation is attached, specifically affixed to the support 40. Since the support 40 and the first heat seal member 20 move together, the sensor 10 detects the acceleration of the first heat seal member 20. Thus, the data (constituted by the output signals) from the sensor 10 indicates the temporal change of the acceleration of the heat seal member 20.

The measurement part 11 is configured to measure the sandwiching time based on the data from the sensor 10. The principle of the measurement will be described.

Figure 4:
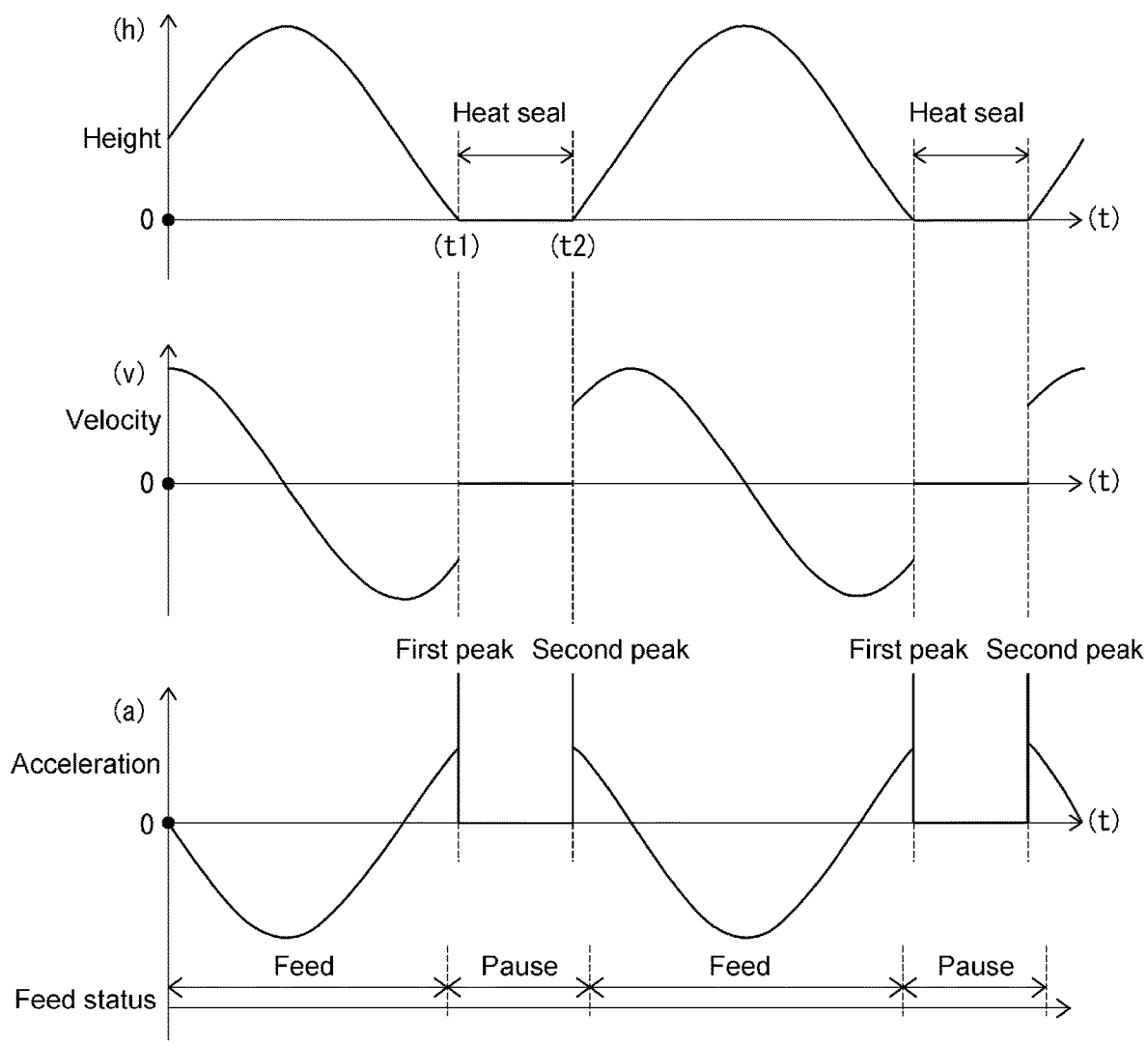
FIG. 4 illustrates a profile of heat seal operation in association with feed status of a web.

FIG. 4 shows the temporal changes in height (h), velocity (v) and acceleration (a) of the first heat seal member 20 during the heat seal operation. The abscissa denotes time (t). FIG. 4 also shows the heat seal operation and the feed status of the webs 60 and 61 in association with each other. The height (h) is referenced to the feed height 62. The upward velocity (v) and acceleration (a) are positive.

As illustrated in FIG. 4, the drive mechanism 4 changes the height (h) in a substantial sine curve. When the first heat seal member 20 moves downward to the feed height 62 to start sandwiching the webs 60 and 61 in cooperation with the second heat seal member 30 (see t=t1), the first heat seal member 20 instantly stops (v=0). Therefore, the first peak of the acceleration (a) is generated due to the start of sandwiching the webs 60 and 61 by the first and second heat seal members 20 and 30, that is, the start of heat-sealing.

Then, as described above, the biasing force of the charge spring 43 continues to be applied to the webs 60 and 61 for a certain period by the pole 41 further moving downward.

Throughout heat-sealing (t1≤t≤t2), a gap 45 (FIG. 3) is generated. If the relative position of the stopper 410 to the pole 41 is higher, the time (t1) when the first heat seal member 20 reaches the feed height 62 is later; if it is lower, the time (t1) is earlier.

Then, the movement of pole 41 reverses from downward to upward, so that the gap 45 becomes smaller. The moment the pole 41 has moved upward by the time the gap 45 disappears (t=t2), the application of the biasing pressure is terminated. The support 40 and the first seal unit 2 start to move together with the pole 41 upward, so that the first heat seal member 20 starts to move away from the webs 60 and 61. At this moment (t=t2), the velocity (v) increases instantly. Therefore, the second peak of the acceleration (a) is generated due to the release of sandwiching the webs 60 and 61 by the first and second heat seal members 20 and 30, i.e., the termination of heat-sealing. At this point, if the relative position of the stopper 410 to the pole 41 is higher, the time (t2) when the first heat seal member 20 starts to move away from the feed height 62 is earlier; if it is lower, the time (t2) is later. In other words, moving the stopper 410 upward with respect to the pole 41 shortens the heat seal time (t2−t1), whereas moving it downward lengthens the heat seal time (t2−t1).

The first and second peaks are detected by the sensor 10. The measurement part 11 then analyses the data received from the sensor 10 to calculate the time from the detected first peak to the detected second peak as the sandwiching time. In this way, the sensor 10 and the measurement part 11 enable accurate measurement of the sandwiching time (i.e., the heat seal time).

The determination part 12 is configured to determine whether or not the measured sandwiching time complies with the predetermined requirement(s). For example, the predetermined requirement may include a requirement that the sandwiching time is out of a predetermined range, a requirement that the sandwiching time is less than a first threshold value, or a requirement that the sandwiching time is greater than a second threshold value. The determination part 12 is capable of determining whether the sandwiching time (the heat seal time) is longer or shorter than the desired time. Here, the sandwiching time may be an average of the sandwiching times measured over multiple heat-sealing operations.

The functional parts (the measurement part 11 and the determination part 12) may be implemented by a processor executing programs stored in a memory medium.

The warning device 13 is configured to output a warning if the sandwiching time complies with the predetermined requirement(s). For example, a too short sandwiching time can be regarded as the application of insufficient biasing pressure to the webs 60 and 61. Therefore, the warning device 13 may output a warning if it is determined that the sandwiching time is less than the lower limit of the predetermined range or the first threshold value. Conversely, a too long sandwiching time can be regarded as the application of excessive biasing pressure to the webs 60 and 61. Therefore, the warning device 13 may output a warning if the sandwiching time is greater than the upper limit of the predetermined range or the second threshold value.

The warning device 13 may include a visual device such as a LED, a lamp, a display, and/or an audio device such as a speaker. Therefore, the output of the warning may be implemented by means of the emission of light and/or the generation of sound.

In addition to and/or instead of this, the warning device 13 may include an emergency stop device that stops the heat seal device 1 or the bag making apparatus including it. If the sandwiching time is too long, the webs 60 and 61 may be fed by the feed device of the bag making apparatus while being sandwiched by the first and second heat seal members 20 and 30. This can result in the failure to feed. Therefore, the output of the warning may be implemented by means of the emergency stop of the heat seal device 1 or the bag making apparatus including it.

Alternatively, the heat seal device 1 may further include a display that indicates the measured sandwiching time. The display may indicate the measured sandwiching time together with the designed value of the sandwiching time.

Since the above configuration allows the sandwiching time and thus the heat seal time to be detected accurately, a user can appropriately adjust and manage this. When the sandwiching time is unsuitable for heat seal or bag making, the user can adjust the sandwiching time (heat seal time). In the implementation, the sandwiching time can be adjusted by the vertical adjustment of the relative position of the stopper 410 to the pole 41. Specifically, adjusting stopper 410 upward with respect to pole 41 shortens the sandwiching time, and adjusting it downward lengthens the sandwiching time. As the failure of the adjustment can be corrected immediately in this way, it is possible to stabilize the quality of heat-sealing without variations.

The sensor 10 in the implementation is located close to one of the poles 41 located on the opposite ends of the support 40, but it may be mounted at any position on the support 40, for example, on the center section of the support 40.

Even a slight difference in the adjusted position of the stopper 410 on the pole 41 between the two poles 41 can lead to differences in the time at which the first and second peaks are detected by the sensor 10 between the position near one pole 41 and the position near the other pole 41. Thus, one sensor 10 may be mounted on one end of the support 40 to be located near one pole 41, and the other sensor 10 may be mounted on the other end of the support 40 to be located near the other pole 41. A user can then adjust the positions of both stoppers 410 referring to the data from these two sensors 10, thereby eliminating the differences in the above peak detection time between the positions near both poles 41. This provides a uniform heat seal time over the longitudinal direction of the heat seal member 20/30, and thus provides heat-sealing with high quality.

The sensor 10 might detect vibration of at least one mechanical component located in the vicinity of the support 40. Therefore, the heat seal device 1 may further include a filter circuit (not shown), which removes the natural frequency of the mechanical component, and pass the detection signals of the sensor 10 through this filter circuit to make the detection signals at the first and second peaks more prominent.

In the above implementation, the first and second heat seal members 20 and 30 are heated by the first and second heaters 21 and 31, respectively, during the heat seal operation. During the heat seal operation, only one of the heat seal members 20 and 30 may be heated and the other may not be heated. In other words, the heat seal device 1 may put one of the internal heater cartridges in a non-heating state during the heat seal operation. Alternatively, the heat seal device 1 may include only one of the heaters 21 and 31. Whether to heat one or both of the heat seal members 20 and 30 is determined depending on the properties of the webs 60 and 61 and the type of bags to be made.

Figure 5A:
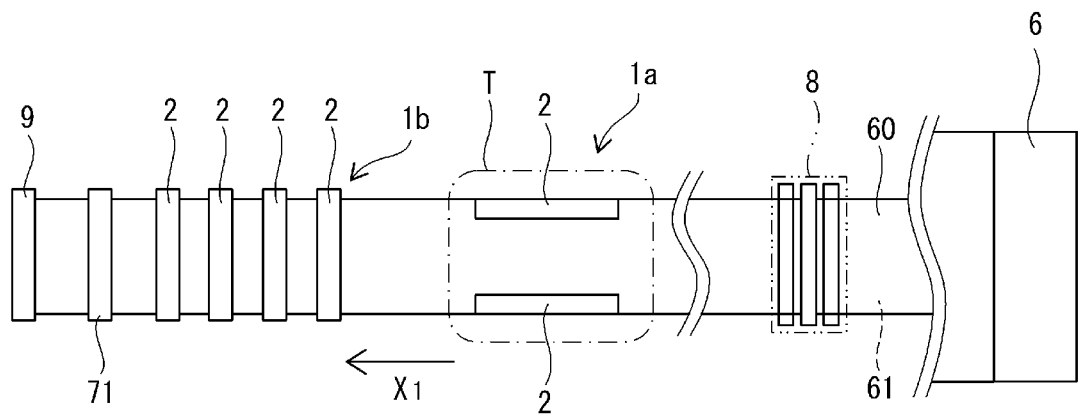
FIG. 5A is a schematic plan view of an example of a bag making apparatus.
Figure 5B:
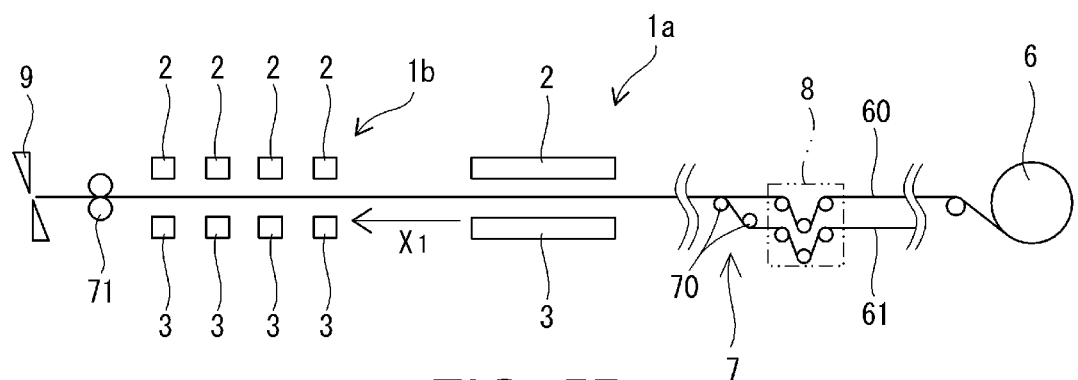
FIG. 5B is a side view of FIG. 5A.
Figure 5C:
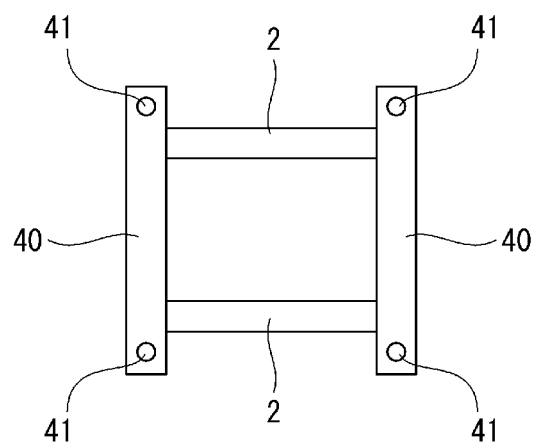
FIG. 5C is a schematic view of an inside of a region T in FIG. 5A.

An example of the bag making apparatus including the heat seal device 1 will be described with reference to FIG. 5A to FIG. 5C.

The bag making apparatus includes a feed device 7 (FIG. 5B) which intermittently feeds the webs 60 and 61 as the sheet panels in their longitudinal direction. The reference sign Xi designates the feed direction of the webs 60 and 61. The feed device 7 may include, for example, a roller 70 for guiding the webs 60 and 61 to superpose them on each other, and a pair of feed rollers 71 which is driven to intermittently feed the webs 60 and 61.

In the implementation, a single wide web is continuously unwound from the roll 6 and slit into the webs 60 and 61. A dancer device 8 appropriately converts the feed of the webs 60 and 61 from the continuous feed into the intermittent feed. The webs 60 and 61 may be, for example, plastic films. Alternatively, each of the webs 60 and 61 may include a base made of paper, and a film or resin material laminated partially or fully to the base.

The bag making apparatus further includes a longitudinal heat seal device 1a as an example of the heat seal device 1. The longitudinal heat seal device 1a is arranged downstream of the dancer device 8 and configured to heat-seal the webs 60 and 61 in their longitudinal direction during the pause phase of the intermittent feed cycle of the webs 60 and 61. The longitudinal heat seal device 1a is configured to heat-seal the webs 60 and 61 every intermittent feed cycle.

The longitudinal heat seal device 1a in the implementation includes two pairs of the first and second seal units 2 and 3 for heat-sealing the webs 60 and 61 on the opposite sides of the webs 60 and 61. FIG. 5C is an enlarged illustration of the region T in FIG. 5A. As illustrated in FIG. 5C, each of two supports 40 extends in the width direction of the webs 60 and 61 over the webs 60 and 61, and supports the two first seal units 2 such that these units 2 are movable in the width direction of the webs 60 and 61. Similarly, the second seal units 3 are also supported by the supports 50 (not shown in FIG. 5A to FIG. 5C) to be movable in the width direction of the webs 60 and 61. It is, therefore, possible to adjust the positions of the pairs of the first and second seal units 2 and 3 in the width direction of the webs 60 and 61. The poles 41 and the components related thereto are disposed on the opposite sides of the two support 40. The two supports 40 and the two supports 50 are disposed to be movable in the longitudinal direction of the webs 60 and 61 via the well-known structure.

The bag making apparatus further includes a cross heat seal device 1b as an example of the heat seal device 1. The cross heat seal device 1b is arranged downstream of the longitudinal heat seal device 1a and configured to heat-seal the webs 60 and 61 in their width direction during the pause phase of the intermittent feed cycle of the webs 60 and 61. The cross heat seal device 1b is configured to heat-seal the webs 60 and 61 every intermittent feed cycle. The cross heat seal device 1b in the implementation includes multiple pairs of first and second seal units 2 and 3.

The number and arrangement of the pairs of first and second seal units 2 and 3 of the heat seal devices 1a and 1b are determined according to such factors as single-line bag making, two-line bag making, the structure of the bag, etc.

The bag making apparatus further includes a cross cut device 9. The cross cut device 9 is configured to cross-cut the webs 60 and 61 in the width direction of the webs 60 and 61 during every intermittent feed cycle of the webs 60 and 61. The bag is made every cross-cutting.

The above bag making apparatus is a mere example. The heat seal device 1 (1a, 1b) may be incorporated into several kinds of the bag making apparatuses. For example, the heat seal device 1 may be incorporated into a bag making apparats for making bags each including not only the webs 60 and 61 as the sheet panels but also an additional component(s), such as side gussets, a bottom gusset, and optionally, may heat-seal the additional component(s) in addition to the webs 60 and 61.

As described above, the heat seal device 1 is capable of adjusting the heat seal time, which is one of the factors that greatly affect the quality of heat-sealing, with high precision, thereby reducing variations in the quality of heat-sealing. Therefore, the bag making apparatus including the heat seal device 1 can reduce production loss due to its high quality of heat-sealing.

The invention claimed is:

1. A heat seal device for use in a bag making apparatus, the heat seal device comprising:
    a first heat seal member;
    a second heat seal member facing the first heat seal member;
    a heater for heating at least one of the first heat seal member or the second heat seal member; and
    a drive mechanism comprising a charge spring for biasing the first heat seal member towards the second heat seal member, and a pole for moving the first heat seal member and for compressing the charge spring, the drive mechanism being configured for reciprocating the pole in a facing direction of the first and second heat seal members to move the first heat seal member towards and away from the second heat seal member in the facing direction and for compressing the charge spring,
    the drive mechanism being configured to:
    start sandwiching a web between the first and second heat seal members;
    then move the pole in a direction of the facing direction in which the first heat seal member moves towards the second heat seal member, to compress the charge spring, thereby pressurizing the web during sandwiching of the web by the first and second heat seal members; and
    then move the pole in a direction of the facing direction in which the first heat seal member moves away from the second heat seal member, to release the sandwiching of the web by the first and second heat seal members,
    the drive mechanism being further configured to, during reciprocation of the pole in the facing direction, generate a first peak of acceleration of the first heat seal member at start of the sandwiching of the web by the first and second heat seal members, and generate a second peak of the acceleration of the first heat seal member at release of the sandwiching of the web by the first and second heat seal members,
    the heat seal device further comprising:
    an accelerometer configured to detect the acceleration of the first heat seal member moving towards and away from the second heat seal member in the facing direction to obtain data indicating a temporal change in the acceleration, the data including the first and second peaks of the acceleration detected by the accelerometer; and
    a processor configured to receive, the data from the accelerometer, and to calculate, using the received data, a time from the detected first peak to the detected second peak as a sandwiching time.

2. The heat seal device of claim 1, wherein the processor is further configured to compare the calculated sandwiching time to a predetermined range, and
    wherein the heat seal device further comprises a warning device configured to output a warning if the processor determines that the calculated sandwiching time is out of the predetermined range.

3. The heat seal device of claim 1, wherein the processor is further configured to compare the calculated sandwiching time to a predetermined threshold value, and
    wherein the heat seal device further comprises a warning device configured to output a warning if the processor determines that the calculated sandwiching time is greater than or less than the predetermined threshold value.

4. The heat seal device of claim 1, wherein the drive mechanism further comprises a support for supporting the first heat seal member, and
    wherein the accelerometer is attached to the support.

* * * * *